United States Patent [19]

Werle et al.

[11] Patent Number: 5,783,091
[45] Date of Patent: Jul. 21, 1998

[54] METHOD FOR THE ALGICIDAL TREATMENT OF WATER

[75] Inventors: Peter Werle, Gelnhausen; Jolanta Holinej, Hainburg; Antje Rueckriegel, Linsengericht, all of Germany

[73] Assignee: Degussa Aktiengesellschaft, Frankfurt am Main, Germany

[21] Appl. No.: 645,334

[22] Filed: May 13, 1996

[30] Foreign Application Priority Data

May 12, 1995 [DE] Germany ............... 195 17 463.1

[51] Int. Cl.$^6$ .................................................. C02F 1/50
[52] U.S. Cl. ............... 210/755; 162/161; 210/759; 210/764; 504/151; 504/158; 514/631; 514/635
[58] Field of Search ............... 162/161; 210/755, 210/759, 764; 504/151, 158, 159; 514/635, 631

[56] References Cited

U.S. PATENT DOCUMENTS

| 4,014,676 | 3/1977 | Carter et al. ............... 71/67 |
|---|---|---|
| 4,253,971 | 3/1981 | MacLeod et al. ............... 210/759 |
| 4,642,234 | 2/1987 | Davies et al. ............... 424/78 |
| 5,449,658 | 9/1995 | Unhoch et al. ............... 504/151 |
| 5,501,802 | 3/1996 | Thorp et al. ............... 210/758 |

FOREIGN PATENT DOCUMENTS

| 87/75999 | 7/1987 | Australia . |
|---|---|---|
| 0 259 249 | 3/1988 | European Pat. Off. . |
| 0 425 016 | 5/1991 | European Pat. Off. . |
| 28 26 019 | 1/1979 | Germany . |

Primary Examiner—Peter A. Hruskoci
Attorney, Agent, or Firm—Beveridge, DeGrandi, Weilacher & Young, L.L.P.

[57] ABSTRACT

Algicides are added to water for the algicidal treatment of the water, especially swimming-pool water. The disadvantages of known methods can be avoided or reduced if chlorohexidine or a salt thereof is used as algicide. Chlorohexidine and its salts are distinguished by a broad spectrum of algicidal action at very low concentrations of use.

16 Claims, 2 Drawing Sheets

5,783,091

1
METHOD FOR THE ALGICIDAL TREATMENT OF WATER

INTRODUCTION AND BACKGROUND

The present invention relates to a method for the algicidal treatment of water, especially swimming-pool water, wherein chlorohexidine or a salt thereof is used as algicide.

Though there is a plurality of biologically active substances for the industrial treatment of water, the maintenance of swimming-pool water in the private sector is essentially limited to halogen-releasing agents or to polymeric biguanidines in combination with oxygen-releasing preparations.

A few disadvantages of chlorine-releasing substances such as chlorine bleaching liquor or calcium hypochlorite include e.g. the elevation of the pH, the high chlorine loss due to UV consumption as well as the frequent inspections which can be eliminated by the use of chlorinated isocyanurates; however, certain chlorine-specific disadvantages remain such as irritations of the mucous membranes, oxidizing action on metals, low concentration of chlorine in the uppermost water layers as well as an enrichment of cyanuric acid in the pool. In addition, one must reckon with the appearance of resistant algae.

For several years, polyhexamethylene biguanide (poly (iminocarboimidoyliminocarboimidoylimino-1,6-hexanediyl) hydrochloride) has been used as a product free of active chlorine for the maintenance of swimming pools (see e.g. GB 1,407,258 (corresponding to U.S. Pat. No. 4,014,676 which is incorporated by reference in its entirety)). Since this polymer has no oxidative action, an oxidizing agent is used in addition in as far as the content of organic substances in the water is to be limited or reduced. Since polymeric biguanide is not compatible with active chlorine, only active-oxygen compounds, e.g. perborates (DE-OS 28 26 019 (corresponding to U.S. Pat. No. 4,253,971 which is incorporated by reference in its entirety)) or persulfates can be considered for this purpose. A disadvantage when using polymeric biguanide is the formation of slimy particles in the water which occurs when it is used for a fairly long time, which particles can hinder the functioning of sieves and filters and optically disturb the bathers. Moreover, after fairly long usage the algicidal action is insufficient, so that an increased use of hydrogen peroxide or per salts is necessary.

SUMMARY OF THE INVENTION

One object of the present invention is to provide an improved method for the algicidal treatment of water, especially swimming-pool water, which does not have the disadvantages of the agents previously used for this purpose or at least has them in a reduced scope.

In achieving the above and other objects, one feature of the present invention resides in the use of chlorohexidine or a salt thereof as algicide.

BRIEF DESCRIPTION OF THE DRAWINGS

The present invention will be further understood with reference to the drawing, wherein.

DETAILED DESCRIPTION OF THE INVENTION

Chlorohexidine (1,1'hexamethylene-bis(5-chlorophenyl)-biguanide)) has long been known as a broad-spectrum antibacterial disinfectant for humans and animals. Although chlorohexidine has been mentioned as a possible component of microbicidal agents, which term usually denotes in a global fashion agents for killing or retarding the growth of microorganisms such as bacteria, fungi and algae, see EP-A 0,425,016 (corresponding to U.S. Pat. No. 5,356,803 which is incorporated by reference in its entirety) and EP-A 0,259,249 (corresponding to AU 8775999, both of which are incorporated by reference in their entirety), the use of chlorohexidine as algicide for the treatment of water has not been previously described. It has now been surprisingly discovered that chlorohexidine and its salts display a very high activity against all kinds of algae and can therefore be included among the most effective algicides.

In addition to chlorohexidine, its salts, especially water-soluble salts, can be used. The chlorohexidine base is purposefully used in the form of a solution in alcohols or glycols. The use of a water-soluble, commercially available chlorohexidine salt, e.g of the lactate or gluconate, is preferred. These water-soluble salts can be used in solid form or as aqueous solution. A 1 to 20% by weight chlorohexidine gluconate solution is preferred. Alternatively, more poorly soluble salts such as chloride or acetate can be added as powder, granulate or tablets to the water to be treated.

The concentration of matter added is a function of the purpose and of the special requirements. Even an amount of 0.1 ppm, that is, 0.1 g chlorohexidine per $m^3$ water is highly effective. An amount of 10 ppm (10 g chlorohexidine per $m^3$ water) does normally not have to be exceeded in practice. 0.025 to 10 ppm chlorohexidine may be used (more than 10 ppm may be used so long as it does not irritate the skin (i.e., is physiologically harmless, which amount is easily determined by a person skilled in the art)). It is preferable to use chlorohexidine or a salt thereof in an amount of 0.1 to 3 ppm (0.1 to 3 g chlorohexidine per $m^3$ water), calculated in each instance as chlorohexidine.

Figure 1:
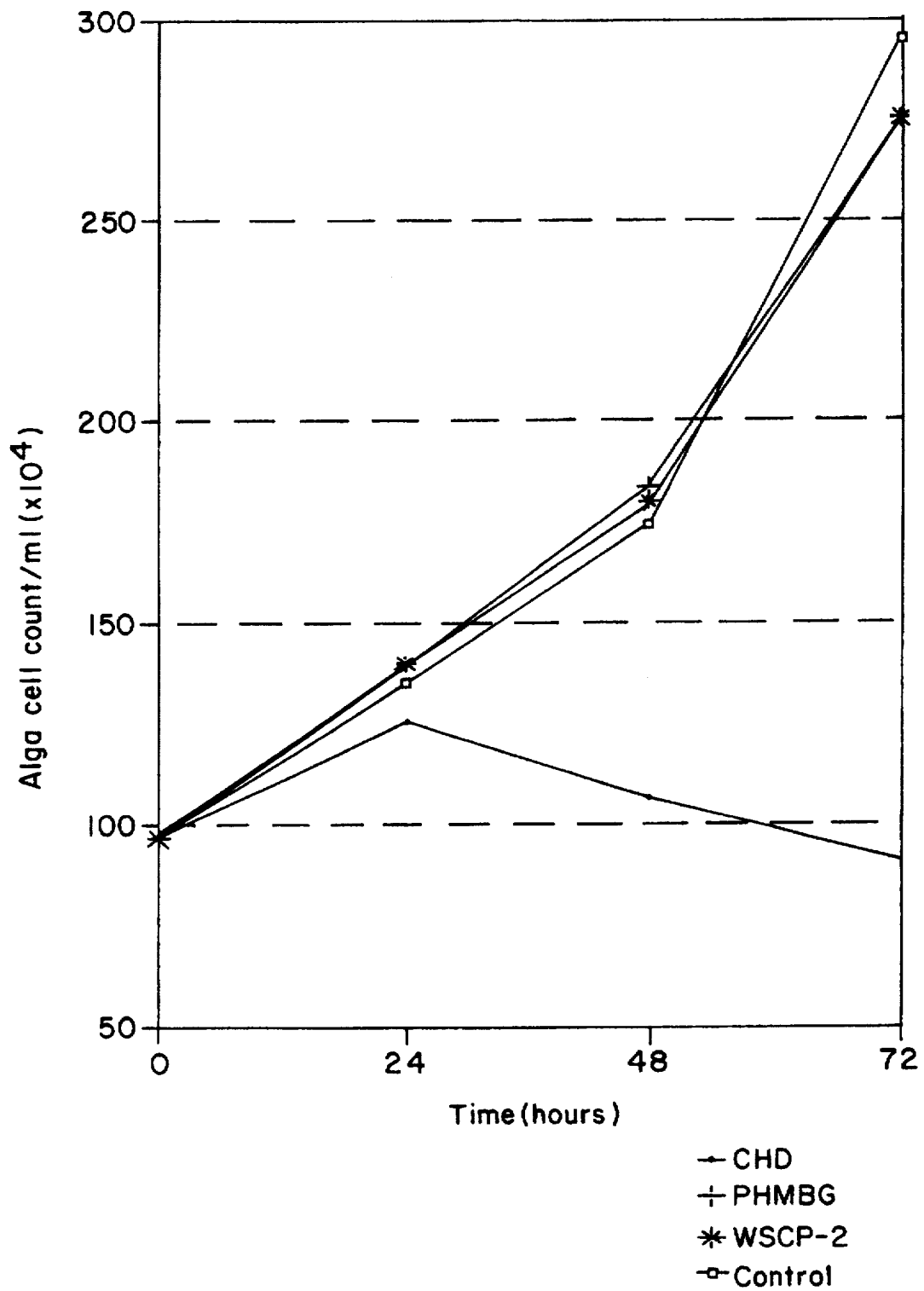
FIG. 1 shows the number of algae cells as a function of the incubation time for blue algae at a concentration of active substances of 0.1 ppm, chlorohexidine (CHD), polyhexamethylene biguanide (PHMBG) and WSCP-2 (poly (hydroxyethylene dimethylimino-ethylene-dimethyliminomethylene dichloride)

FIG. 1 shows the number of algae cells as a function of the incubation time for blue algae at a concentration of active substances of 0.1 ppm: chlorohexidine (CHD), polyhexamethylene biguanide (PHMBG) and WSCP-2 (see example 1). The surprisingly high algicidal action (=inhibition of growth) follows on the curve for CHD in comparison to the other substances.

Chlorohexidine or a salt thereof can be used for the algicidal treatment of water alone or in combination with other algicides and/or other microbicidal active substances, e.g. bactericidal, virucidal and fungicidal active substances. However, other algicides and/or other microbicidal active substances, e.g. bactericidal, virucidal and fungicidal active substances, are not required and are only optionally used in the present invention with chlorohexidine or a salt thereof. In addition, the present invention does not require and preferably does not use the enzymes utilized in U.S. Pat. No. 5,356,803. Furthermore, the present invention does not require and preferably does not use the aryl- or aryloxyalkanol, anionic surfactant, zwitterionic and amphoteric surfactant, nonionic surfactant, dihydric alcohol, $C_{8-12}$ fatty acid, solubilizer, and/or deionized water utilized in EP-A 0,259,249 (corresponding to AU 8775999).

For example, combinations of chlorohexidine or a salt thereof with an algicidally active, polymeric guanidine compound, especially polyhexamethylene biguanide, are very effective. The dosages of the cited biguanide—used alone (that is, without chlorohexidine) at/over 10 ppm—can be considerably reduced by such a combination so that the initially cited disadvantages are reduced; any opacity which occurs will dissolve again given sufficient dilution with the water to be treated.

Chlorohexidine and its salts can be combined both with active oxygen compounds, especially hydrogen peroxide and compounds releasing hydrogen peroxide as well as peracetic acid and with active chlorine compounds, especially chlorine and chlorinated isocyanurates. This creates the prerequisites for keeping the water clear even after long usage. A shot chlorination is possible even in the case of very unfavorable water conditions or as a prophylaxis for the reduction of organic material without discolorations or opacity occurring in the water. The combination of chlorohexidine and a salt thereof with hydrogen peroxide is especially advantageous because in this case, in contrast to the combination PHMBG/$H_2O_2$, a lesser dosage of $H_2O_2$ is necessary.

The use of chlorohexidine and chlorohexidine salts as algicide in the treatment of water is distinguished by the surprisingly high algicidal action and therewith the very low dosage amount and the broad spectrum of action against all algae and, in addition, other microorganisms. Further advantages are the good compatibility with other algicides as well as active oxygen compounds and active chlorine compounds. The formation of opacity and slime is avoided either entirely or to a large extent. Finally, chlorohexidine and its salts are physiologically harmless, in particular, they do not irritate the skin, so that they are especially suited for use in private and public swimming pools.

EXAMPLES 1 and 2

Determination of the Inhibition of Algae Growth

The cells of an algae species were cultivated for several generations in a defined medium. The algicide was added in various concentrations. Chlorohexidine (=CHD) was tested in comparison to polyhexamethylene biguanide (=PHMBG) and poly(hydroxyethylene dimethylimino-ethylene-dimethylimino-methylene dichloride) (=WSCP-2; Buckman Laboratories, Bad Homburg, Germany) as well as to a control free of algicide. Chlorohexidine was used in all of the examples herein (examples 1 to 6) as 20% by weight chlorohexidine gluconate solution.

The test batch was produced by mixing appropriate amounts of nutrient solution concentrate, water, stock solution of the test substance and inoculation (seed) material of an exponentially growing alga culture. The alga genera used in the test can be found in any conceivable location, to wit, on the ground, on moist flower pots, in standing and flowing water, on moist rocks and even in the air. The species were obtained from the Plant Physiological Institute of the University of Gottingen. The present invention is not limited to the specific alga species utilized herein. Whether a specific alga species is susceptible to treatment by the present invention can be easily determined by simply repeating the examples herein using the alga species to be tested for susceptibility.

The test batches were incubated for a minimum time of 72 h during which the cell number was determined every 24 h.

The inhibition was measured as a reduction of the growth in comparison to a control culture grown under identical conditions.

The following tables show the inhibition of growth for blue algae (=example 1) and green algae (=example 2) in the presence of (a) CHD, (b) PHMBG, and (c) WSCP-2 at various concentrations as well as in the absence of an algicide (control).

Example 1: Blue Alga

| Conc. (ppm) | Cell number/ml after exposure time ($\times 10^4$) | | | |
|---|---|---|---|---|
| | 0 h | 24 h | 48 h | 72 h |
| (a) Active substance: CHD Alga species: *Synechocystis minuscula* pH: 9.0 | | | | |
| 0.05 | 97 | 135 | 140 | 133 |
| 0.1 | 97 | 126 | 107 | 92 |
| 0.25 | 97 | 125 | 105 | 90 |
| 0.5 | 97 | 110 | 86 | 85 |
| 1.0 | 97 | 106 | 92 | 91 |
| 2.5 | 97 | 105 | 93 | 93 |
| Control | 97 | 135 | 175 | 295 |
| (b) Active substance: PHMBG Alga species: *S. minuscula* pH: 9.0 | | | | |
| 0.05 | 97 | 140 | 185 | 300 |
| 0.1 | 97 | 139 | 184 | 275 |
| 0.25 | 97 | 115 | 92 | 85 |
| 0.5 | 97 | 94 | 86 | 85 |
| 1.0 | 97 | 93 | 86 | 91 |
| 2.5 | 97 | 80 | 80 | 84 |
| Control | 97 | 135 | 175 | 295 |
| (c) Active substance: WSCP-2 Alga species: *S. minuscula* pH: 9.0 | | | | |
| 0.1 | 97 | 140 | 180 | 275 |
| 0.25 | 97 | 141 | 183 | 286 |
| 0.5 | 97 | 142 | 195 | 330 |
| 1.0 | 97 | 130 | 148 | 190 |
| 2.5 | 97 | 130 | 154 | 210 |
| Control | 97 | 135 | 175 | 295 |

Example 2: Green Alga

| Conc. (ppm) | Cell number/ml after exposure time ($\times 10^4$) | | | |
|---|---|---|---|---|
| | 0 h | 24 h | 48 h | 72 h |
| (a) Active substance: CHD Alga species: *Scenedesmus subspicatus* pH: 8.0 | | | | |
| 0.025 | 8.0 | 15 | 19 | 24 |
| 0.05 | 8.0 | 16 | 18 | 15 |
| 0.1 | 8.0 | 15 | 15 | 13 |
| 0.25 | 8.0 | 14 | 14 | 11 |
| 0.5 | 8.0 | 12 | 13 | 10 |
| Control | 8.0 | 21 | 74 | 126 |
| (b) Active substance: PHMBG Alga species: *S. subspicatus* | | | | |
| 0.025 | 8.0 | 16 | 44 | 79 |
| 0.05 | 8.0 | 17 | 42 | 84 |
| 0.1 | 8.0 | 17 | 27 | 59 |
| 0.25 | 8.0 | 16 | 17 | 12 |
| 0.5 | 8.0 | 10 | 7.0 | 6.0 |
| Control | 8.0 | 21 | 74 | 126 |
| (c) Active substance: WSCP-2 Alga species: *S. subspicatus* | | | | |
| 0.025 | 8.0 | 16 | 68 | 149 |
| 0.05 | 8.0 | 18 | 68 | 191 |
| 0.1 | 8.0 | 8.0 | 36 | 98 |

-continued

| | Cell number/ml after exposure time ($\times 10^4$) | | | |
|---|---|---|---|---|
| Conc. (ppm) | 0 h | 24 h | 48 h | 72 h |
| 0.25 | 8.0 | 12 | 40 | 140 |
| 0.5 | 8.0 | 8.0 | 14 | 12 |
| Control | 8.0 | 21 | 74 | 126 |

EXAMPLE 3

Determination of the Algicidal Activity in the Suspension Test

Execution: The cells of the alga species were cultivated several days on inclined alga tubes and washed off for the test with a defined medium.

The test material was produced by mixing appropriate amounts of nutrient solution, water stock solution of the test substance and inoculation material of the alga culture.

The test batches were incubated 14 days at room temperature under exposure to light (24 hours/day (=h/d) in each instance) and evaluated visually daily in comparison to the control cultures.

Figure 2:
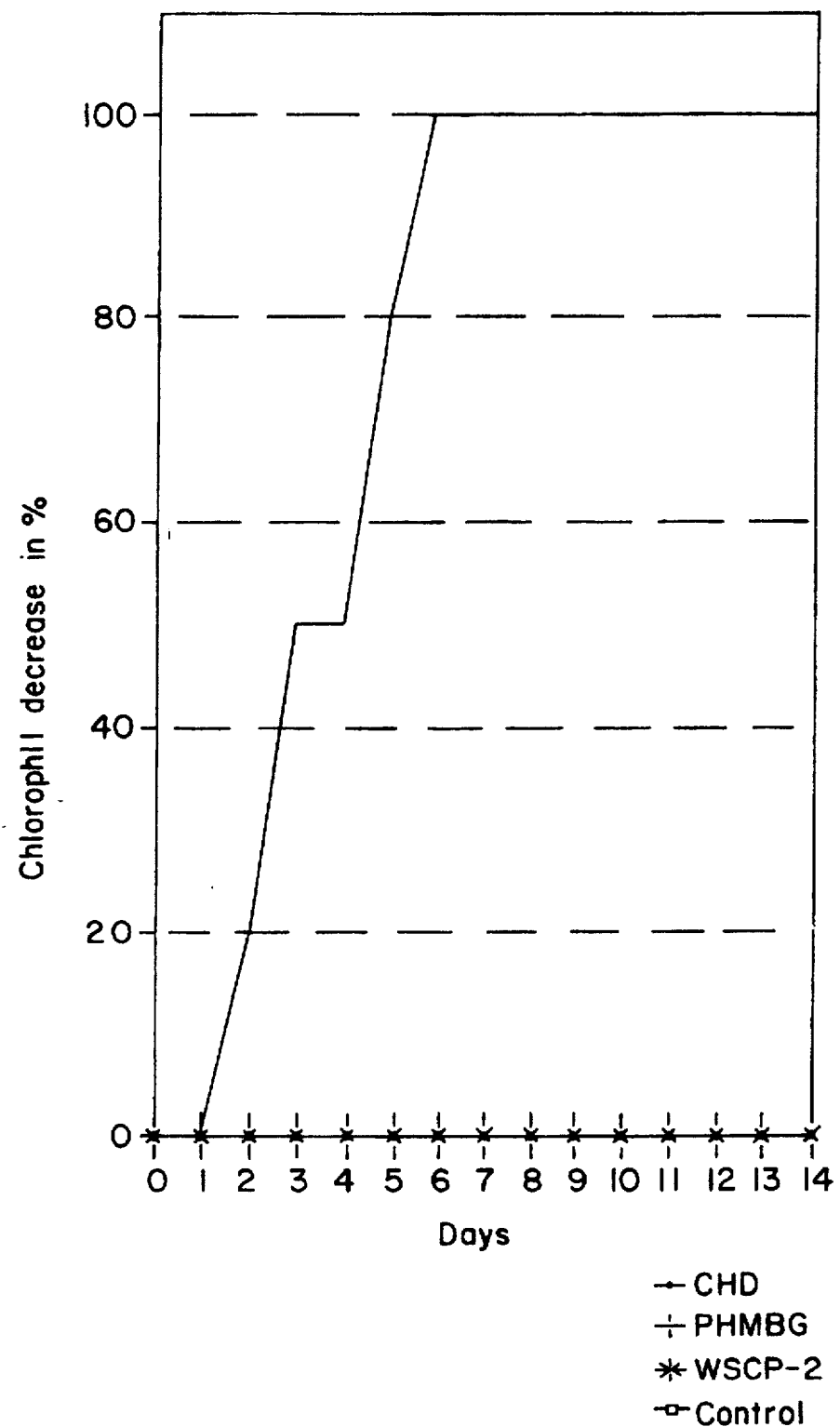
FIG. 2 shows the decrease of chlorophyll in a suspension test within 14 days using green algae as an example at a concentration of active substances of 1 ppm each of CHD, PHMBG and WSCP-2.

The spectrum of activity and spectrum of intensity of the active substances tested are apparent from the following tables. For purposes of comparison, those concentrations of CHD, PHMBG and WSCP which displayed the same action in the alga species are characterized with a (W). FIG. 2 shows the activity at 1 ppm active substance of the three substances within 14 days using the example of the green alga.

FIG. 2 shows the decrease of chlorophyll in a suspension test within 14 days using green alga as an example at a concentration of active substances of 1 ppm each of CHD, PHMBG and WSCP-2. Whereas the chlorophyll content decreases by 100% with CHD (1 ppm) within 5 days, the comparative substances show no action at the same concentration of active substances.

| Evaluation scale | % |
|---|---|
| −: Decomposition of the chlorophyll | 100 |
| (+): Chlorophyll still visible | 80 |
| +: Distinct chlorophyll | 50 |
| ++: Substantial chlorophyll | 20 |
| +++: Chlorophyll like control | 0 |

| Alga species | pH | Conc. (ppm) | Evaluation |
|---|---|---|---|
| (a) Active substance: CHD | | | |
| S. minuscula | 7.2 | 1.0 (W) | −5 days |
| (blue alga) | 7.2 | 2.5 | −5 days |
| | 7.2 | 5.0 | −5 days |
| S. subspicatus | 10.2 | 1.0 (W) | −3 days |
| (green alga) | 10.2 | 2.5 | −3 days |
| | 10.2 | 5.0 | −3 days |
| Chlorella | 7.2 | 1.0 (W) | −6 days |
| vulgaris | 7.2 | 2.5 | −5 days |
| (green alga) | 7.2 | 5.0 | −5 days |
| (b) Active substance: PHMBG | | | |
| S. minuscula | 9.4 | 1.0 | +++14 days |
| (blue alga) | 9.4 | 2.5 | ++14 days |
| | 9.4 | 5.0 | −8 days |
| | 9.4 | 10.0 (W) | −3 days |
| S. subspicatus | 10.2 | 1.0 | ++2 days |
| (green alga) | 10.2 | 2.5 | −10 days |
| | 10.2 | 5.0 (W) | −3 days |
| Chlorella | 7.2 | 1.0 | ++2 days |
| vulgaris | 7.2 | 2.5 | (+)10 days |
| (green alga) | 7.2 | 5.0 (W) | −2 days |
| (c) Active substance: WSCP-2 | | | |
| S. minuscula | 7.2 | 1.0 | +++14 days |
| (blue alga) | 7.2 | 2.5 | +++14 days |
| | 7.2 | 5.0 | (+)5 days |
| | 7.2 | 10.0 (W) | −4 days |
| S. subspicatus | 10.2 | 1.0 | ++2 days |
| (green alga) | 10.2 | 2.5 | −3 days |
| | 10.2 | 5.0 (W) | −3 days |
| Chlorella | 7.2 | 1.0 | +++14 days |
| vulgaris | 7.2 | 2.5 | +9 days |
| (green alga) | 7.2 | 5.0 (W) | −5 days |

EXAMPLE 4

Determination of the Algicidal Activity in the Suspension Test with a Problematic Mixed Alga Culture from Swimming-pool Water The alga mixture was cultivated under laboratory conditions. The execution took place as described in example 3. 10 ppm chlorohexidine were used as algicide.

Result: Decomposition of the entire chlorophyll after four days; water color shifts from green to colorless. No more changes recognizable in the further course of the test, that is, no cell division of the algae was visible any more.

EXAMPLE 5

Test in a Test Basin (15 m³)

| Appearance of the water: | Greenish, slightly turbid (good alga growth recognizable) |
|---|---|
| Additive: | 3 ppm chlorohexidine |
| Appearance after 2 days: | water-clear |
| Appearance after 1 week: | water-clear |
| Appearance after 2 weeks: | water-clear |
| Appearance after 3 weeks: | slight alga growth recognizable. |

EXAMPLE 6

Algicidal Treatment of a Swimming Pool (600 m³) for Wintering by a One-time Addition of Chlorohexidine

| Appearance of the water: | slightly green, turbid |
|---|---|
| Amount added: | 10 ppm chlorohexidine |
| Appearance after 15 days; | clean, clear, no alga growth recognizable. |

The basin was able to be cleaned very easily after wintering; the coating on the tile was able to be readily removed.

Further variations and modifications of the foregoing will be apparent to those skilled in the art and such variations and modifications are attended to be encompassed by the claims that are appended hereto.

German Application 195 17 463.1 filed on 12 May 1995 is relied on and incorporated by reference in its entirety.

We claim:

1. A method for the algicidal treatment of water containing algae and chlorophyll comprising adding to said water a sufficient amount of chlorohexidine or a salt thereof to inhibit the growth of said algae and decompose said chlorophyll in said water.

2. The method according to claim 1, wherein said salt is lactate, gluconate, chloride or acetate.

3. The method according to claim 2, wherein said salt is 1 to 20% by weight chlorohexidine gluconate solution.

4. The method according to claim 1, wherein the concentration of said chlorohexidine or a salt thereof is 0.1 to 10 ppm calculated as chlorohexidine.

5. The method according to claim 4, wherein the concentration of said chlorohexidine or a salt thereof is 0.1 to 3 ppm calculated as chlorohexidine.

6. The method according to claim 1, wherein said chlorohexidine or a salt thereof is added in combination with an active oxygen compound or active chlorine compound.

7. The method according to claim 6, wherein said active chlorine compound is an algicidally active polymeric guanidine compound, chlorine or chlorinated isocyanurate.

8. The method according to claim 7, wherein said algicidally active polymeric guanidine compound is polyhexamethylene biguanide.

9. The method according to claim 6, wherein said active oxygen compound is peracetic acid, hydrogen peroxide or a compound releasing hydrogen peroxide.

10. The method according to claim 1, wherein the concentration of said chlorohexidine or a salt thereof is an amount effective to keep said water clear of algae for at least three days.

11. The method according to claim 1, wherein the concentration of said chlorohexidine or a salt thereof is an amount effective to prevent algae in said water from increasing for at least three days.

12. The method according to claim 1 wherein the amount of chlorohexidine added to said water is from 0.025 to 10 ppm calculated as chlorohexidine.

13. The method according to claim 1 wherein the amount of chlorohexidine added to said water is from 0.1 to 3 ppm calculated as chlorohexidine.

14. A method for the algicidal treatment of swimming pool water containing algae and chlorophyll, comprising adding to said swimming pool water an effective amount of chlorohexidine or a salt thereof to inhibit the growth of said algae and decompose said chlorophyll in said swimming pool water.

15. The method according to claim 14 wherein the amount of chlorohexidine added is sufficient to convert the swimming pool water from green to colorless in appearance.

16. The method for treating water for removal of algae and chlorophyll therefrom comprising adding to said water an effective amount of chlorohexidine or salt thereof to inhibit the growth of said algae and decompose said chlorophyll in said water.

* * * * *